Figure 6:
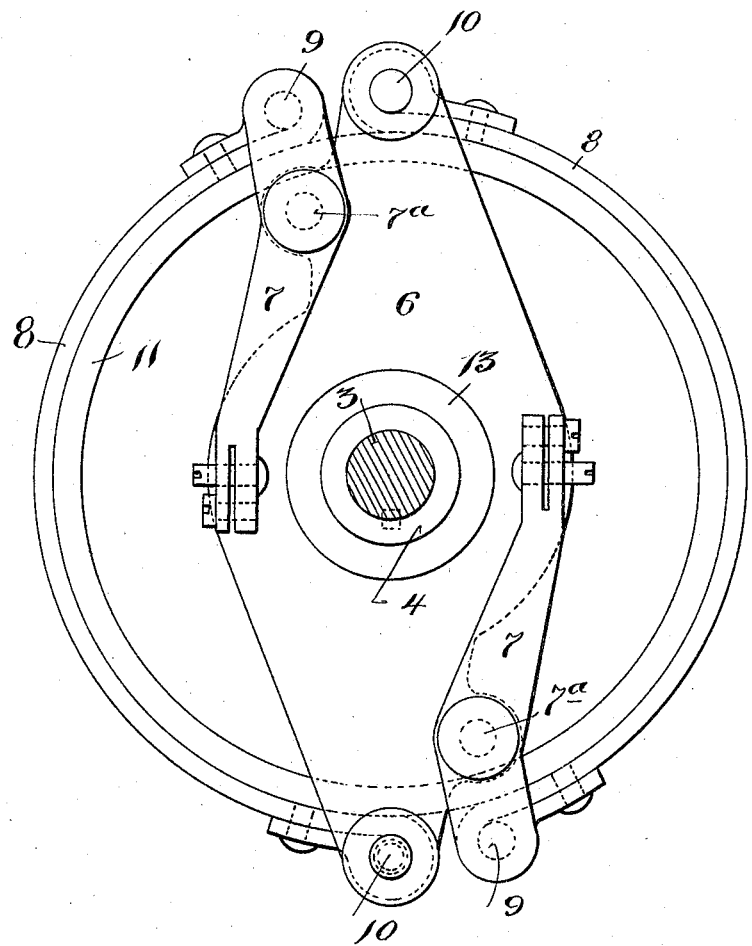

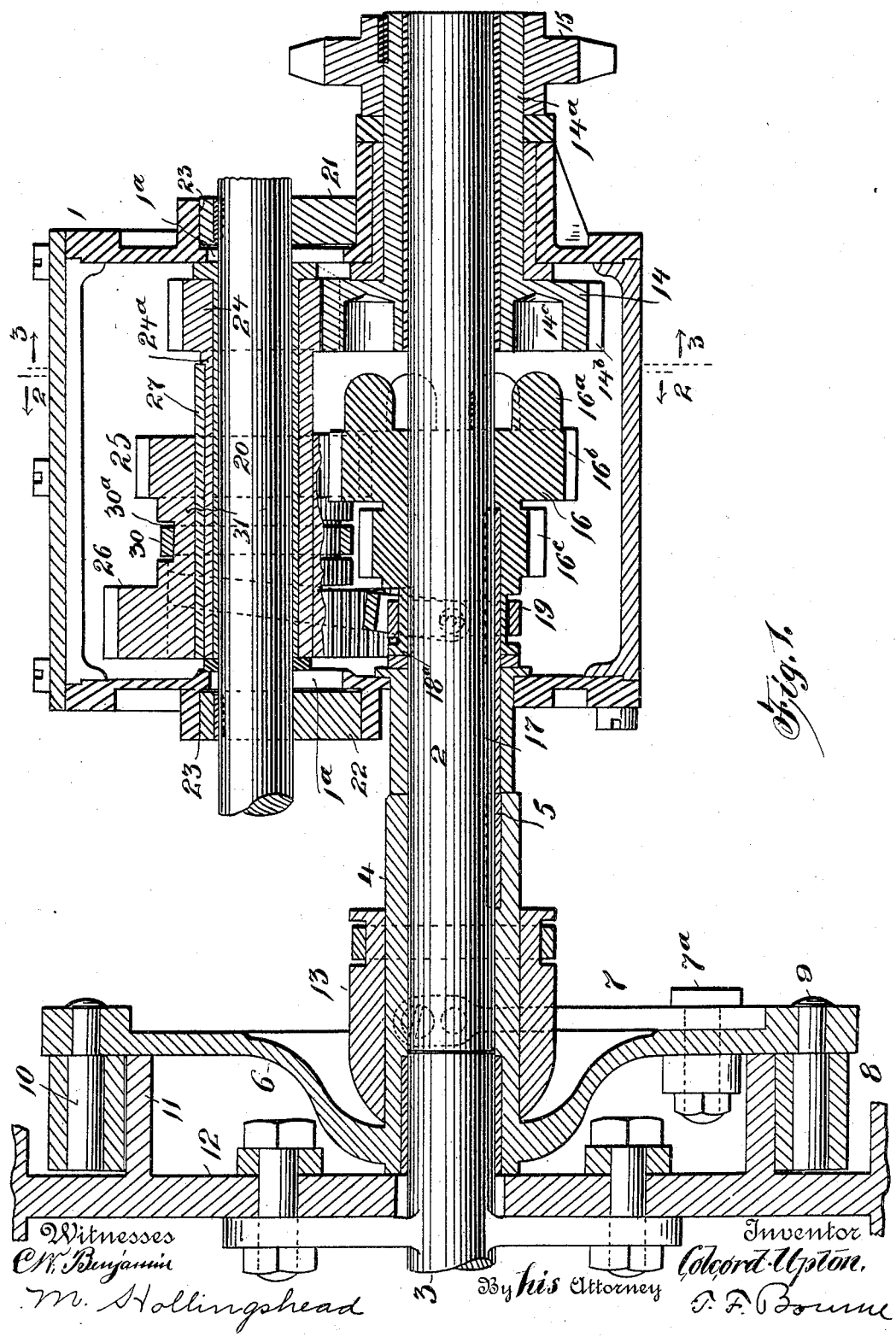

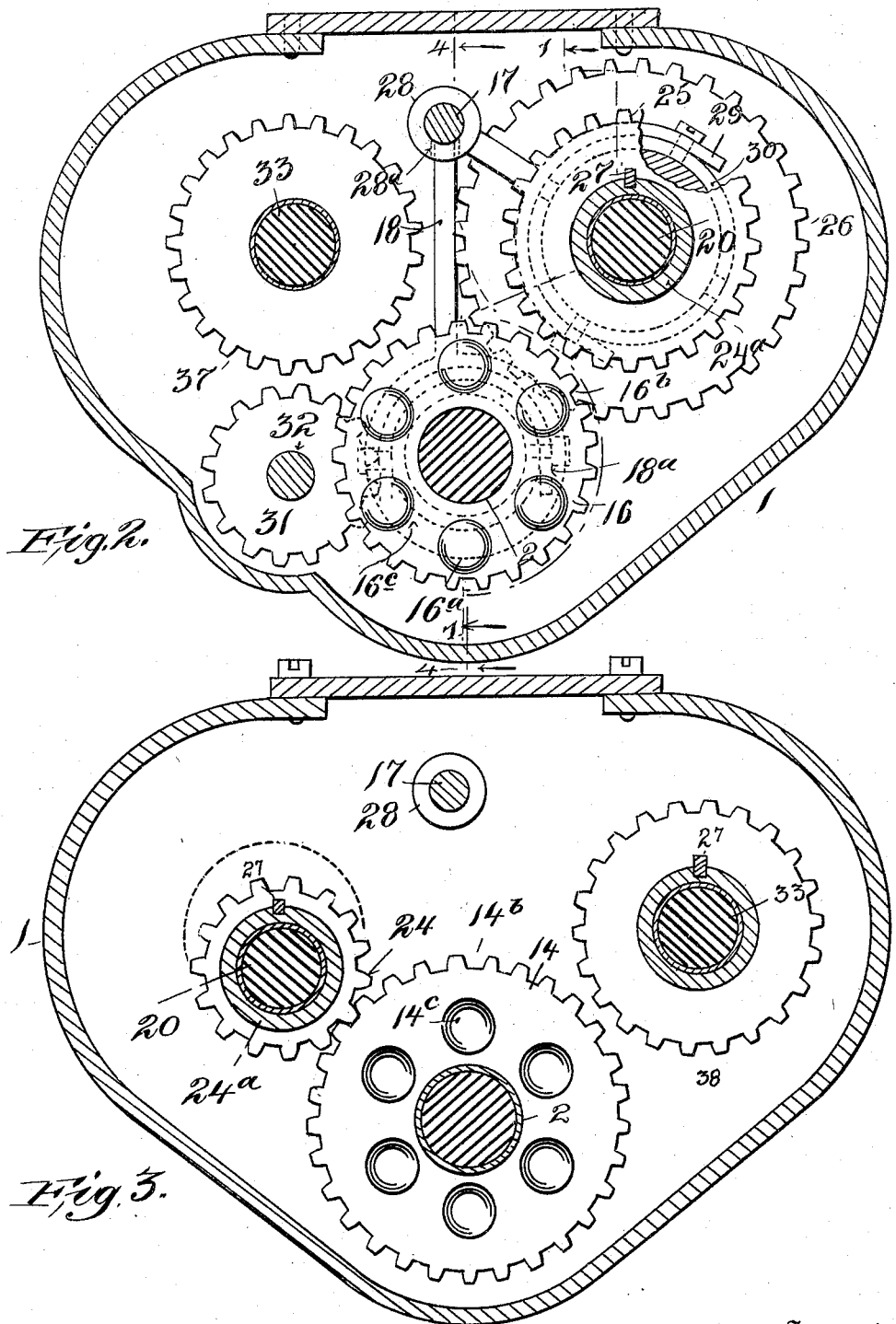

No. 794,133. PATENTED JULY 4, 1905.
C. UPTON.
TRANSMISSION GEARING.
APPLICATION FILED JULY 30, 1904.
4 SHEETS—SHEET 3.
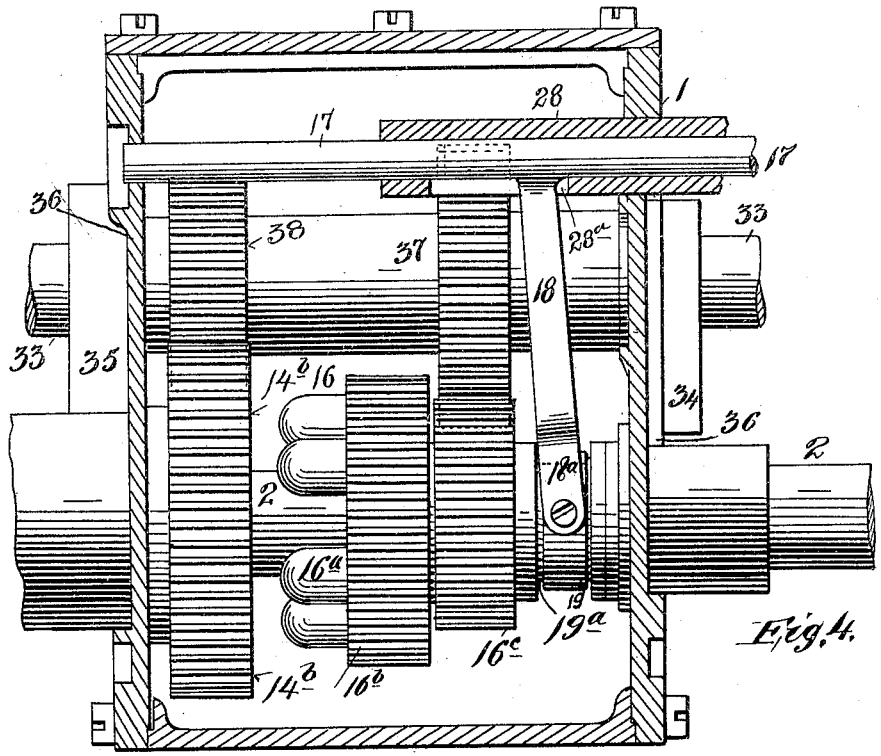
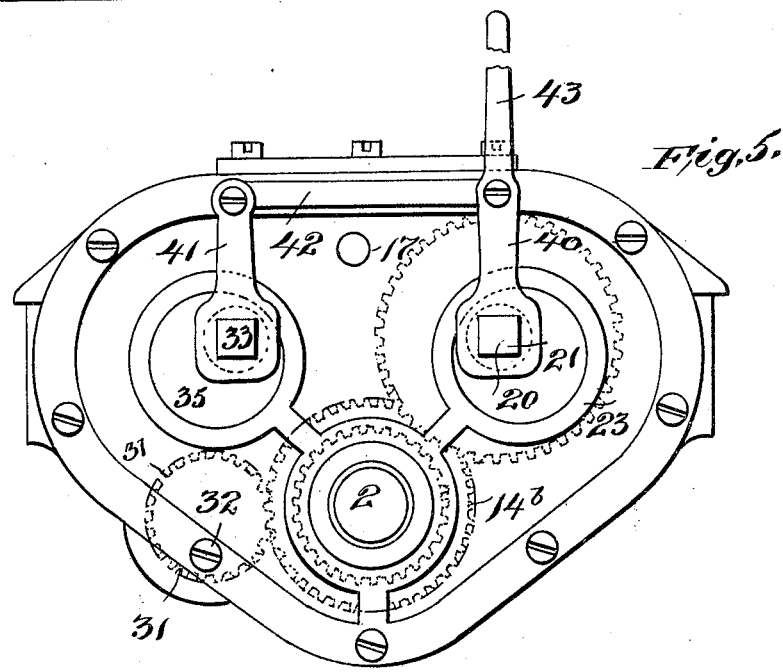
Witnesses
C. W. Benjamin
M. Hollingshead
Inventor
Colcord Upton.
By his Attorney
T. F. Bourne No. 794,133.

Patented July 4, 1905.

UNITED STATES PATENT OFFICE.

COLCORD UPTON, OF EAST DANVERS, MASSACHUSETTS, ASSIGNOR TO UPTON MOTOR COMPANY, A CORPORATION OF NEW JERSEY.

TRANSMISSION-GEARING.

SPECIFICATION forming part of Letters Patent No. 794,133, dated July 4, 1905.

Application filed July 30, 1904. Serial No. 218,865.

*To all whom it may concern:*

Be it known that I, COLCORD UPTON, a citizen of the United States, residing in East Danvers, Essex county, Massachusetts, have invented certain new and useful Improvements in Transmission-Gearing, of which the following is a specification.

My invention relates to improvements in variable-speed gearing, commonly called "transmission-gearing," and such as is particularly adapted for automobiles; and the invention has for its object to provide efficient mechanism whereby three speeds forward may be transmitted to a rotary or driven member from a source of power, as well as a reverse speed; and to such ends the invention comprises the novel details of improvement that will be more fully hereinafter set forth and then pointed out in the claims.

Reference is to be had to the accompanying drawings, forming part hereof, wherein—

Figure 1 is a central longitudinal section of a transmission-gearing embodying my invention, taken substantially on the line 1 1 in Fig. 2. Fig. 2 is a cross-section thereof substantially on the line 2 2 in Fig. 1 looking toward the left. Fig. 3 is a similar view substantially on the line 3 3 in Fig. 1 looking toward the right thereof. Fig. 4 is a longitudinal section substantially on the line 4 4 in Fig. 2 looking toward the left. Fig. 5 is an end view looking from the right in Fig. 1, on a reduced scale, the sprocket-wheel being removed; and Fig. 6 is a face view of the clutch device shown in Fig. 1.

Similar numerals of reference indicate corresponding parts in the several views.

In the drawings the numeral 1 indicates generally a suitable frame or casing in which is journaled a shaft 2 to be driven from a motor or other source of power. In the illustration shown the shaft 2 is adapted to be rotated intermittently or, as desired, from a motor-shaft or rotary part 3 by means of a friction clutch device, which may be of any well-known construction. As shown in the drawings, a sleeve 4 is secured to shaft 2 by a key 5, which sleeve has extensions 6, on which are supported levers 7, as by pivots 7ª, which levers are connected with friction-bands 8, as by pins 9, the opposite ends of which bands are connected with the support 6, as by pins 10, and said bands surround or lie upon a friction flange or rim 11, projecting from fly-wheel 12, secured upon shaft 3. The free ends of the lever 7 overlie a sliding sleeve or cam 13, shown mounted upon sleeve or hub 4, whereby when the sleeve 13 is slid under the levers 7 the latter will cause the bands 8 to grip the flange 11, thereby causing shaft 2 to be frictionally connected with and rotated by shaft 3.

At 14 is indicated a gear mounted to rotate freely upon shaft 2, and to the hub 14ª of said gear is secured a sprocket or other power-transmitting element or member 15 in the nature of a driven member.

At 16 is a member mounted to slide along shaft 2 and attached thereto so as to rotate therewith, as by means of a key 17, which member 16 is adapted to be connected with member 14, so as to rotate the latter and member 15 therewith. For this purpose I have shown a clutch device between said members 14 and 16, wherein the member 16 has projections or teeth 16ª to engage sockets or recesses 14ᶜ in member 14. When the members 14 and 16 are firmly connected together, the high speed forward of the driven member or sprocket 15 will be produced from the shaft 2, at which time the latter will be connected by the friction device with shaft 3 through the fly-wheel 12. This high speed of the driven member 15 may be varied by permitting said friction device to slip. The member 16 may be slid into and out of engagement with member 14 by any suitable means. For this purpose I have shown a shaft 17 mounted in bearings in frame 1 so as to slide longitudinally and provided with an arm 18, having a fork 18ª engaging a collar or the like 19, mounted in an annular groove 19ª in member 16, whereby when shaft 17 is shifted longitudinally the members 14 and 16 will be brought into and out of engagement. Any suitable means may be provided for shifting the shaft 17.

The means for rotating the driven member or sprocket 15 at lower speeds forward than by the clutch $14^c$ $16^a$ are arranged as follows: A shaft 20, adapted to be moved laterally respecting the axis of shaft 2 or bodily in the arc of a circle, passes through suitable openings $1^a$ in frame 1 and is eccentrically supported in disks 21 22, to which said shaft may be keyed or otherwise secured, one of which disks may be made integral with the shaft, if desired, and said disks are mounted to rock in bearings 23 on frame 1, the arrangement being such that as disks 21 and 22 are rocked in one direction or the other shaft 20 will be caused to move relatively nearer to or farther from shaft 2. At 24 is a gear mounted to rotate freely upon shaft 20, and upon the hub $24^a$ of said gear are mounted two gears 25 26, adapted to slide along the hub $24^a$ and attached thereto so as to rotate therewith by a key 27. The gear 24 is adapted to mesh with gear-teeth $14^b$ on member 14. The gear 25 is adapted to mesh with gear-teeth $16^b$ on member 16, and gear 26 is adapted to mesh with gear-teeth $16^c$ on member 16. The relative positions of said gears are such that gears 24 and $14^b$ are maintained in line to be brought into and out of mesh by the lateral movement of shaft 20; but when gear 25 is in line with gear $16^b$ the gear 26 will be out of line with gear $16^c$, so that when the last-named gears are brought into alinement gear 25 will be out of line with gear $16^b$, and when clutch members $14^c$ and $16^a$ are in mesh gears 25 and $16^b$ will be out of mesh. Suitable means may be provided for shifting gears 25 26 along shaft 20, and for this purpose I have shown a sleeve 28 mounted to slide upon shaft 17 and provided with a fork 29, shown engaging a collar 30, located in a groove $30^a$ in the hub 31 between gears 25 and 26, the sleeve 28 being shown provided with a slot $28^a$, through which the arm 18 passes, Fig. 2. Any suitable means may be provided for shifting sleeve 28 and fork 29.

From the foregoing it will be understood that when the clutch members $16^a$ $14^a$ are out of engagement, as in Fig. 1, and gear 25 is opposite gear $16^b$ by then rocking disks 21 22 toward the left in Figs. 2 and 5 shaft 20 will be caused to approach shaft 2, (by reason of the eccentric position of shaft 20 with respect to disks 21 22,) whereupon gear 24 will be thrown into mesh with gear $14^b$ and gear 25 into mesh with gear $16^b$, and thereupon when the clutch-sleeve 13 is shifted to cause shaft 2 to be rotated by fly-wheel 12 with shaft 3 the driven member or sprocket 15 will be rotated forwardly at an intermediate speed. For the low speed forward, shaft 20 having been adjusted to the right in Figs. 2 and 5, gears 25 and 26 will be shifted by fork 29 to move gear 26 into line with gear $16^c$ and gear 25 out of line with gear $16^b$, and then when shaft 20 is moved by its eccentric disks to the left in Figs. 2 and 5 gear 24 will be brought into mesh with gear $14^b$ and gear 26 will be placed in mesh with gear $16^c$, so that when shafts 2 and 3 are again connected for rotation the driven member or sprocket 15 will be rotated forwardly at the low speed. In either of such positions of gears 25 and 26 varying speeds may be further produced by permitting the friction connection between shafts 2 and 3 to slip. For rotating the driven member or sprocket 15 in the reverse direction I provide the following arrangements: A reversing-pinion 31, pivotally carried by the main frame 1, as upon a shaft 32, meshes with gear $16^c$, (see Figs. 2 and 5,) and at 33 is an eccentrically-supported shaft, arranged similarly to shaft 20, being supported eccentrically in disks 34 35, keyed or otherwise secured to said shaft and supported in bearings 36 on frame 1. Upon shaft 33 is loosely journaled a gear 37, adapted to mesh with reversing-pinion 31, and 38 is a gear connected to rotate with gear 37 and located in line with gear $14^b$ to mesh therewith. The arrangement is such that when shaft 33 is caused by its eccentric disks to move toward shaft 2 gear 37 will be brought into mesh with pinion 31 and gear 38 into mesh with gear $14^b$, and then when the clutch is operated to connect shafts 2 and 3 the driven member or sprocket 15 will be rotated in the reverse direction, the speed of such rotation being governed by the ratio of the gearing.

It will be understood that when high speed forward of driven member 15 is to be obtained shafts 20 and 33 will be adjusted so that the gears carried thereby will be out of mesh with their respective coacting gears, whereby the member 16 may be shifted toward member 14 without interference, and the arrangement is also such that shafts 20 and 33 are to be moved toward shaft 2 independent of each other. In order to conveniently shift or adjust shafts 20 and 33 in the proper directions, they may be connected together, so that when one is shifted toward shaft 2 the other will be shifted away from it. To this end I have shown in Fig. 5 the shafts 20 and 33 provided with arms 40 and 41, respectively secured to said shafts and pivotally connected by a link 42, an arm or extension 43 serving as an operating means. From this it will be apparent that when arm 43 is shifted to the left in Fig. 5 shaft 20 will be caused to approach shaft 2 and shaft 33 to move away from shaft 2 by reason of the eccentric disks supporting said shafts, whereby gears 25 and 26, according to their adjustment along shaft 20, will be caused to produce the desired speed forward of the driven member 15, and likewise when arm 43 is shifted to the right in Fig. 5 shaft 20 will be caused to move away from shaft 2 and shaft 33 to approach shaft 2, whereupon the reversing-gears will be brought into action.

By reason of the arrangement described for connecting shafts 2 and 3 as desired it will be apparent that the various gears may be brought into action while they are not rotating, for when the driven member 15 is to be rotated the clutch 6 7 11, &c., will first be uncoupled and then the member 16 or either shaft 20 and its gears 25 26 or shaft 33, with its gears 37 38, will be adjusted to produce the desired speed, so that the clutch $16^a$ $14^c$ or the gears will be brought into mesh while not being driven from the motor-shaft, and then when adjustment has been made the main clutch will be operated to connect shafts 2 and 3. Furthermore, the last-named clutch may be uncoupled before the speed-gears are thrown out of connection to relieve them of strain during disconnection and also to permit the parts to run free when desired.

My invention is not limited to the details of construction shown and described nor the relative arrangements of the gears and clutches, as the same may be varied without departing from the spirit of my invention, it being understood also that if power is applied to the sprocket 15 the shaft 2 may be utilized as the driven member from which power is to be transmitted at varying speeds.

Having now described my invention, what I claim is—

1. A transmission-gearing comprising a driving member, a driven member, a clutch to connect them rotatively, and gearing interposed between said members, part of said gearing being supported to have lateral adjustment and being adjustable in a direction at right angles thereto to vary the speed of the driven member, substantially as described.

2. A transmission-gearing comprising a driving member, a driven member, a clutch to connect them rotatively, gearing interposed between said members, part of said gearing being supported to have lateral adjustment and being adjustable in a direction at right angles thereto to vary the speed of the driven member, a rotative part, and means for connecting and disconnecting said part with one of said members, substantially as described.

3. A transmission-gearing comprising a driving member, a driven member, a clutch to connect them rotatively, gearing interposed between said members, part of said gearing being supported to have lateral adjustment and being adjustable in a direction at right angles thereto to vary the speed of the driven member, and means for reversing the direction of rotation of the driven member, substantially as described.

4. A transmission-gearing comprising a driving member, a driven member, a clutch to connect them rotatively, a shaft supported to have lateral adjustment, gearing interposed between said shaft and said members, part of said gearing being adjustable in the direction of the length of said shaft to vary the speed of the driven member, another shaft supported to have lateral movement, and gearing interposed between said shaft and said members adapted to be thrown into and out of mesh by the adjustment of said shaft for reversing the direction of rotation of the driven member, substantially as described.

5. A transmission-gearing comprising a driving member, a driven member, a gear connected with one member, a plurality of gears connected with the other member, gearing supported to have adjustment toward and from said members, and adapted to be thrown into and out of mesh with the first-named gears by such adjustment, part of said gearing also being adjustable sidewise for varying the speed of the driven member, substantially as described.

6. A transmission-gearing comprising a driving member, a driven member, a gear connected with one member, a plurality of gears connected with the other member, gearing supported to have adjustment toward and from said members, and adapted to be thrown into and out of mesh with the first-named gears by such adjustment, part of said gearing also being adjustable sidewise for varying the speed of the driven member, a rotative part, and means for connecting and disconnecting one of said members with said part, substantially as described.

7. A transmission-gearing comprising a driving member, a driven member, a gear connected with one member, a plurality of gears connected with the other member, gearing supported to have adjustment toward and from said members, and adapted to be thrown into and out of mesh with the first-named gears by such adjustment, part of said gearing also being adjustable sidewise for varying the speed of the driven member, and means for reversing the direction of rotation of the driven member, substantially as described.

8. A transmission-gearing comprising a driving member, a driven member, a gear connected with one member, a plurality of gears connected with the other member, a shaft supported to have lateral movement, gearing connected with said shaft adapted to be thrown into and out of mesh with the first-named gears by the lateral movement of said shaft, part of said gearing being adjustable in the direction of the length of said shaft for varying the speed of the driven member, another shaft supported to have lateral adjustment, and gearing interposed between said shaft and said members for reversing the direction of rotation of one of said members, substantially as described.

9. A transmission-gearing comprising a driving member, a driven member, an adjustable part connected with one of said members, a clutch between said part and the other member, a shaft mounted to have lateral adjustment, gears connected with said adjustable part and with said member, gearing connected with said shaft, part of said gearing being adjustable in the direction of the length of the shaft for varying the speed of the driven member, and means to reverse the direction of rotation of the driven member, substantially as described.

10. A transmission-gearing comprising a driving member, a driven member, an adjustable part connected with one of said members, a clutch between said part and the other member, gearing interposed between said part and the last-named member, means for causing said gearing to be thrown into and out of mesh, a shaft supported to have lateral adjustment, and gearing interposed between said shaft and said adjustable part and member for reversing the rotation of said member, substantially as described.

11. In a transmission-gearing the combination of a shaft, a rotative member, a plurality of gears adjustably connected with said shaft, a clutch between said gears and said member, a plurality of gears supported adjustably with respect to the first-named gears and arranged to be moved at right angles to such adjustment all to cause one set of gears to mesh while the other set is out of mesh, a gear 24 movably connected with the second-named gears, a gear 14 to mesh with the gear 24 for rotating the rotative member, a rotative part, means for connecting and disconnecting said part and said shaft, and means for reversing the direction of rotation of said rotative member, substantially as described.

12. In a transmission-gearing the combination of a shaft, a rotative member, a plurality of gears adjustably connected with said shaft, a clutch interposed between said gears and said member, a shaft mounted to have lateral adjustment, a plurality of gears adjustably carried by said shaft to have movement along the same for alternate meshing with one or the other of the first-named gears, a gear 24 interposed between said adjustable gears and said member, said adjustable gears being rotatively and slidably connected with the gear 24, and means for reversing the rotation of the driven member, substantially as described.

13. In a transmission-gearing the combination of a shaft, gearing adjustably connected with said shaft, a rotative member, a clutch to connect and disconnect said member and gearing, a shaft mounted to have lateral adjustment, a plurality of gears carried by said shaft to slide in the direction of the length of the shaft and so disposed that one of said gears will mesh with one of the first-named gears while another gear is out of mesh with the other of the first-named gears, said clutch being arranged so that when its parts are in mesh the gears connected therewith will be out of line with the gears connected with said shaft, and gearing connecting the gearing of the adjustable shaft with said member, substantially as described.

14. In a transmission-gearing the combination of a shaft, a plurality of gears adjustably connected therewith, a rotative member, a clutch to connect said gears to said member, a shaft adjustably supported to have movement toward and from the first-named shaft, a gear connected with said member, a gear to operate therewith and carried by said shaft, a plurality of gears rotatively connected with the last-named gear and also slidably connected therewith, said plurality of gears being spaced apart differently from the spacing of the first-named gears so that two of said gears may mesh while two others are out of mesh, the clutch being so disposed that when in mesh its gears will be out of mesh with the adjustable gears of said adjustable shaft, substantially as described.

15. In a transmission-gearing the combination of a shaft, a plurality of gears adjustably connected therewith, a rotative member, a clutch to connect said gears to said member, a shaft adjustably supported to have movement toward and from the first-named shaft, a gear connected with said member, a gear to operate therewith and carried by said shaft, a plurality of gears adjustably connected with the last-named gear to have sliding movement independent thereof, said adjustable gears being spaced apart differently from the spacing of the first-named gears so that two of said gears may mesh while two others are out of mesh, the clutch being so disposed that when its parts are in mesh its gears will be out of mesh with the adjustable gears of said adjustable shaft, means for reversing the rotation of said member, a rotative part, and a clutch device for connecting the first-named shaft with said part, substantially as described.

16. In a transmission-gearing the combination of a shaft, a plurality of gears adjustably connected therewith, a rotative member, means to connect and disconnect said gears with said member, a gear connected with said member, an adjustable shaft, disks eccentrically supporting said shaft, laterally-adjustable gearing connected with said shaft to mesh alternately with the first-named gears, and a gear connected with said adjustable gears and in line to mesh with the gear connected with said member, substantially as described.

COLCORD UPTON.

Witnesses:
T. F. BOURNE,
M. HOLLINGSHEAD.